(12) United States Patent
Zhu et al.

(10) Patent No.: US 10,118,639 B2
(45) Date of Patent: Nov. 6, 2018

(54) METHOD AND SYSTEM FOR STEERING CONTROL OF AN AUTONOMOUS VEHICLE USING PROPORTIONAL, INTEGRAL, AND DERIVATIVE (PID) CONTROLLER

(71) Applicant: Baidu USA LLC, Sunnyvale, CA (US)

(72) Inventors: Fan Zhu, Sunnyvale, CA (US); Qi Kong, Sunnyvale, CA (US); Xiang Yu, Sunnyvale, CA (US); Sen Hu, Sunnyvale, CA (US); Qi Luo, Sunnyvale, CA (US); Zhenguang Zhu, Beijing (CN); Yuchang Pan, Beijing (CN); Wenli Yang, Beijing (CN); Guang Yang, San Jose, CA (US); Jingao Wang, Saratoga, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 124 days.

(21) Appl. No.: 15/316,490

(22) PCT Filed: Nov. 24, 2016

(86) PCT No.: PCT/CN2016/107109
§ 371 (c)(1),
(2) Date: Dec. 5, 2016

(87) PCT Pub. No.: WO2018/094647
PCT Pub. Date: May 31, 2018

(65) Prior Publication Data
US 2018/0186403 A1    Jul. 5, 2018

(51) Int. Cl.
*B62D 6/00* (2006.01)
*G05B 19/402* (2006.01)
*B62D 6/02* (2006.01)

(52) U.S. Cl.
CPC ............... *B62D 6/002* (2013.01); *B62D 6/02* (2013.01); *G05B 19/402* (2013.01); *G05B 2219/42033* (2013.01)

(58) Field of Classification Search
CPC ........ B62D 6/002; B62D 6/02; G05B 19/402; G05B 2219/42033
See application file for complete search history.

(56) References Cited

U.S. PATENT DOCUMENTS

| | | | |
|---|---|---|---|
| 2010/0094520 A1* | 4/2010 | Zagorski | B60T 7/22 701/70 |
| 2015/0057886 A1* | 2/2015 | Larsson | G08G 1/166 701/41 |
| 2016/0282874 A1* | 9/2016 | Kurata | G05D 1/0289 |
| 2016/0311431 A1* | 10/2016 | Kato | B62D 1/28 |

* cited by examiner

*Primary Examiner* — Mary Cheung
(74) *Attorney, Agent, or Firm* — Womble Bond Dickinson (US) LLP

(57) ABSTRACT

In one embodiment, an autonomous driving vehicle (ADV) steering control system determines how much and when to apply a steering control to maneuver obstacles of a planned route. The steering control system calculates a first steering angle based on a target directional angle and an actual directional angle of the ADV, a second steering angle based on a target lateral position and an actual lateral position of the ADV to maneuver a planned route, an object, or an obstacle course. The steering control system determines a target steering angle based on the first steering angle and the second steering angles and utilizes the target steering angle to control a subsequent steering angle of the ADV.

27 Claims, 11 Drawing Sheets

METHOD AND SYSTEM FOR STEERING CONTROL OF AN AUTONOMOUS VEHICLE USING PROPORTIONAL, INTEGRAL, AND DERIVATIVE (PID) CONTROLLER

CROSS-REFERENCE TO RELATED APPLICATION

This patent application is a U.S. National Phase Application under 35 U.S.C. § 371 of International Application No. PCT/CN2016/107109, filed Nov. 24, 2016, entitled METHOD AND SYSTEM FOR STEERING CONTROL OF AN AUTONOMOUS VEHICLE USING PROPORTIONAL, INTEGRAL, AND DERIVATIVE (PID) CONTROLLER, which is incorporated by reference herein by its entirety.

TECHNICAL FIELD

Embodiments of the present invention relate generally to operating autonomous vehicles. More particularly, embodiments of the invention relate to autonomous vehicle steering control.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Steer control is a critical operation in autonomous driving. Autonomous vehicles require an autonomous steer control to maneuver obstacles autonomously following a planned route. However, a planned route at different time intervals may have different factors influencing the steer control sensitivity such as the vehicular speed, the turning radius of the vehicle, and the maneuver being carried out (e.g., last command). Furthermore, there may be a relative lateral displacement, or path offset, of the autonomous vehicle, or autonomous driving vehicle, or ADV from the planned route that requires a steering compensation.

SUMMARY

Embodiments of the present disclosure provide a computer-implemented method for steering controlling of an autonomous vehicle, a non-transitory machine-readable medium, and a data processing system.

In an aspect of the disclosure, the computer-implemented method for steering controlling of an autonomous vehicle comprises: calculating a first steering angle based on a target directional angle and an actual directional angle of the autonomous vehicle to maneuver an obstacle course; calculating a second steering angle based on a target lateral position and an actual lateral position of the autonomous vehicle to maneuver the obstacle course; determining a target steering angle based on the first and second steering angles; and controlling a subsequent steering angle of the autonomous vehicle based on the next target steering angle.

In another aspect of the disclosure, the non-transitory machine-readable medium having instructions stored therein, which when executed by a processor, cause the processor to perform operations of steering control of an autonomous vehicle, the operations comprising: calculating a first steering angle based on a target directional angle and an actual directional angle of the autonomous vehicle to maneuver an obstacle course; calculating a second steering angle based on a target lateral position and an actual lateral position of the autonomous vehicle to maneuver the obstacle course; determining a target steering angle based on the first and second steering angles; and controlling a subsequent steering angle of the autonomous vehicle based on the next target steering angle.

In a further aspect of the disclosure, the data processing system, comprising: a processor; and a memory coupled to the processor to store instructions, which when executed by the processor, cause the processor to perform operations of steering control of an autonomous vehicle, the operations including: calculating a first steering angle based on a target directional angle and an actual directional angle of the autonomous vehicle to maneuver an obstacle course; calculating a second steering angle based on a target lateral position and an actual lateral position of the autonomous vehicle to maneuver the obstacle course; determining a target steering angle based on the first and second steering angles; and controlling a subsequent steering angle of the autonomous vehicle based on the next target steering angle.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
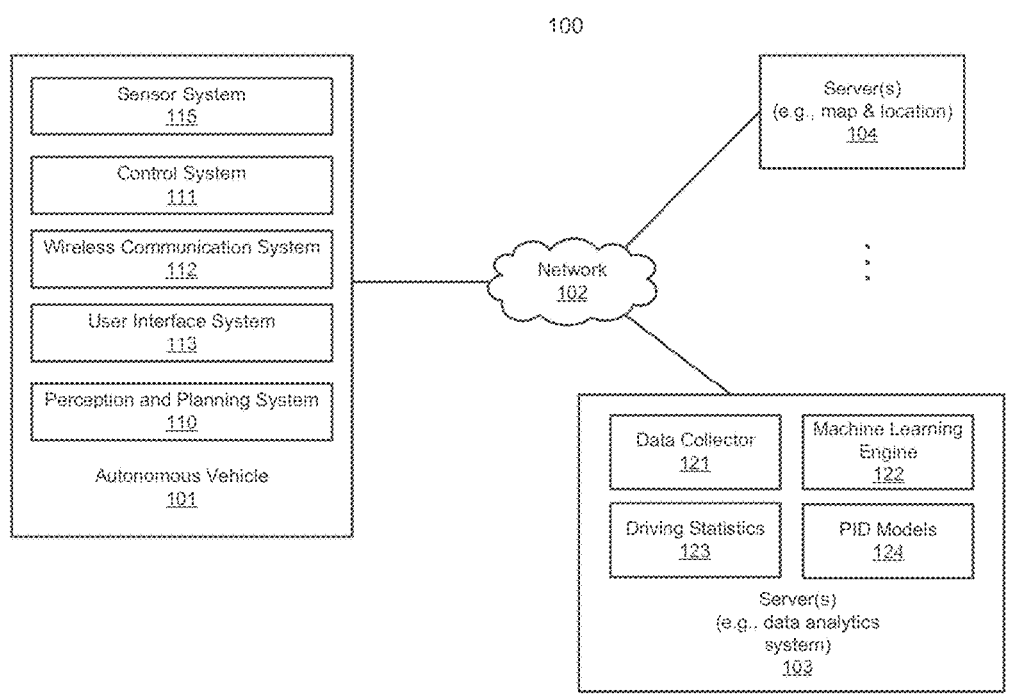
FIG. 1 is a block diagram illustrating a networked system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a control module of a perception and planning system determines how much and when to apply a steering command in a form of a steering angle of a steering control of an autonomous driving vehicle (ADV) to turn or maneuver around and/or avoid an obstacle of a planned route in view of a command delay in sending the instruction to the steering wheel control and a delay in acquiring the data of the ADV's directional angle and position. The planned route may have different factors influencing the steering control sensitivity such as the vehicle speed, the turning radius of the vehicle, and the turning or maneuver being carried out (e.g., last command).

In one embodiment, a control module calculates a first steering angle based on a target directional angle and an actual directional angle of an autonomous vehicle, a second steering angle based on a target lateral position and an actual lateral position of the ADV. The control module determines a target steering angle based on the first and second steering angles to control a subsequent steering angle of the ADV, in view of a delay in sending an instruction to steer the ADV and a delay in acquiring data on the ADV's directional angle and position.

In one embodiment, the first steering angle is calculated using a first proportional-integral-derivative (PID) controller based on a target directional angle and an actual directional angle of an ADV. In another embodiment, a proportional coefficient of the first PID controller is adjusted dynamically based on the current speed of the ADV. In another embodiment, the proportional coefficient of the first PID controller is reduced in response to determining that the current speed is above a predetermined threshold. In another embodiment, a derivative coefficient of the first PID controller is adjusted while the ADV is in operation based on the current speed of the ADV.

In one embodiment, the proportional coefficient of a first PID controller is adjusted based on the turning radius of an ADV. In another embodiment, the proportional coefficient of the first PID controller is increased in response to determining that the turning radius is above a predetermined threshold.

In one embodiment, a control module calculates a second steering angle based on a target lateral position of an ADV and an actual lateral position of the ADV. The control module calculates the second steering angle using a second PID controller to compensate for a lateral offset of the ADV. In another embodiment, the proportional, integral, and derivative coefficients of the second PID controller is adjusted dynamically based on the current speed of the ADV, the current turning radius of the ADV and a last command of the ADV.

FIG. 1 is a block diagram illustrating an autonomous vehicle network configuration according to one embodiment of the invention. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
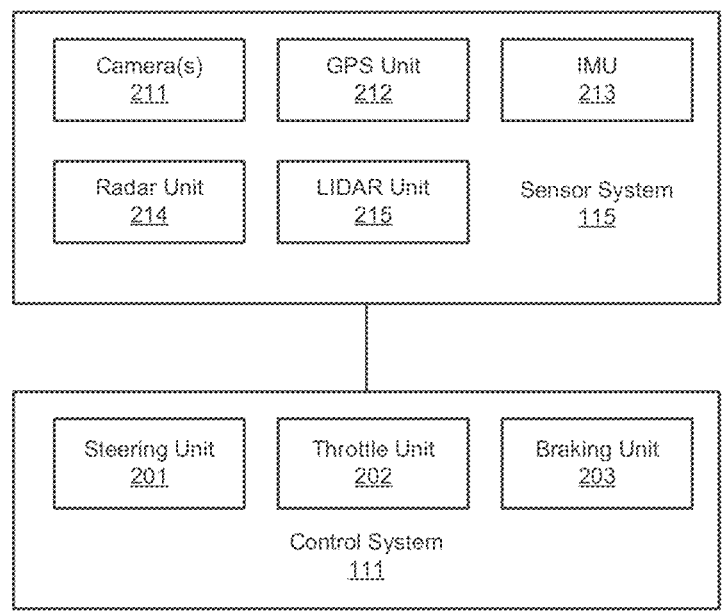
FIG. 2 is a block diagram illustrating an example of an autonomous vehicle according to one embodiment of the invention.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

In one embodiment, the first and second PID controllers may be modeled by a first and a second of each of the proportional, integral, and derivative coefficients, respectively. These coefficients may be configured offline by a data analytics system based on a large amount of driving statistics, such as, for example data analytics system or server 103.

In one embodiment, data analytics system 103 includes data collector 121 and machine-learning engine 122. Data collector 121 collects driving statistics 123 from a variety of vehicles for a period of time. Driving statistics 123 may include information concerning the target and actual steering angle of the ADV, GPS locations with reference to time, the brand/model of the ADV, the vehicular identification number, planned routes, and sensor outputs of the driving environment such as the weather and road conditions. Machine learning engine 122 analyzes driving statistics 123 to learn and determine the suitable proportional, integral and derivative coefficients for the PID models 124 to represent fast and stable PID controller responses to compensate for the deviation in target and actual steering angles and the deviation in target and actual lateral positions of the ADV. The PID models 124 can then be uploaded onto perception and planning system 110 of autonomous vehicle 101 to be utilized for decisions of steering control.

Figure 3:
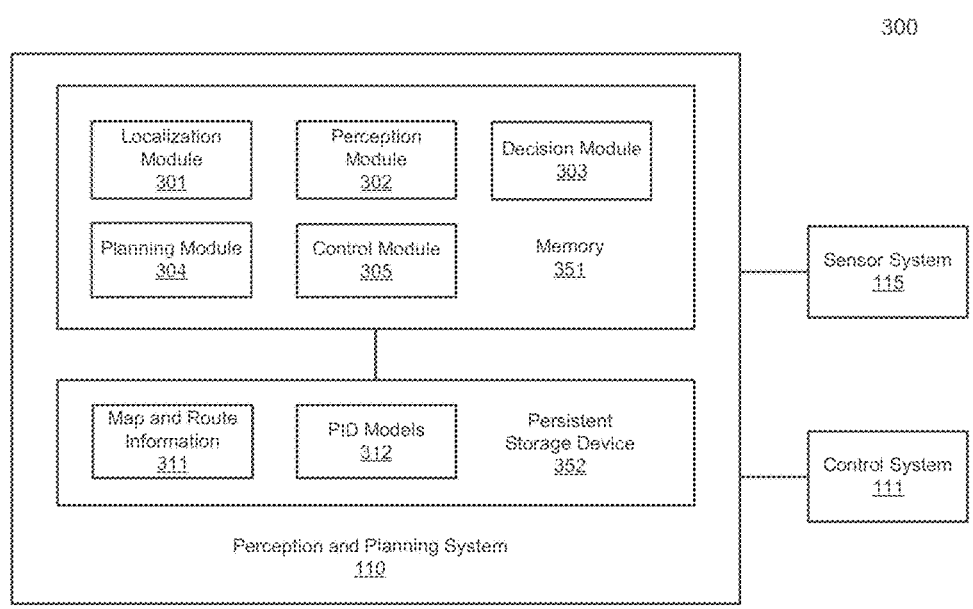
FIG. 3 is a block diagram illustrating an example of a perception and planning system used with an autonomous vehicle according to one embodiment of the invention.

FIG. 3 is a block diagram illustrating an example of a perception and planning system used with an autonomous vehicle according to one embodiment of the invention. System 300 may be implemented as a part of autonomous vehicle 101 of FIG. 1 including, but is not limited to, perception and planning system 110, control system 111, and sensor system 115. Referring to FIG. 3, perception and planning system 110 includes, but is not limited to, localization module 301, perception module 302, decision module 303, planning module 304, and control module 305.

Some or all of modules 301-305 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-305 may be integrated together as an integrated module.

Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, decision module 303 makes a decision regarding how to handle the object. For example, for a particular object (e.g., another vehicle in a crossing route) as well as its metadata describing the object (e.g., a speed, direction, turning angle), decision module 303 decides how to encounter the object (e.g., overtake, yield, stop, pass). Decision module 303 may make such decisions according to a set of rules such as traffic rules, which may be stored in persistent storage device 352 (not shown).

Based on a decision for each of the objects perceived, planning module 304 plans a path or route for the autonomous vehicle, as well as driving parameters (e.g., distance, speed, and/or turning angle). That is, for a given object, decision module 303 decides what to do with the object, while planning module 304 determines how to do it. For example, for a given object, decision module 303 may decide to pass the object, while planning module 304 may determine whether to pass on the left side or right side of the object. Planning and control data is generated by planning module 304 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 305 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

Note that decision module 303 and planning module 304 may be integrated as an integrated module. Decision module 303/planning module 304 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 303/planning module 304 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Figure 4A:
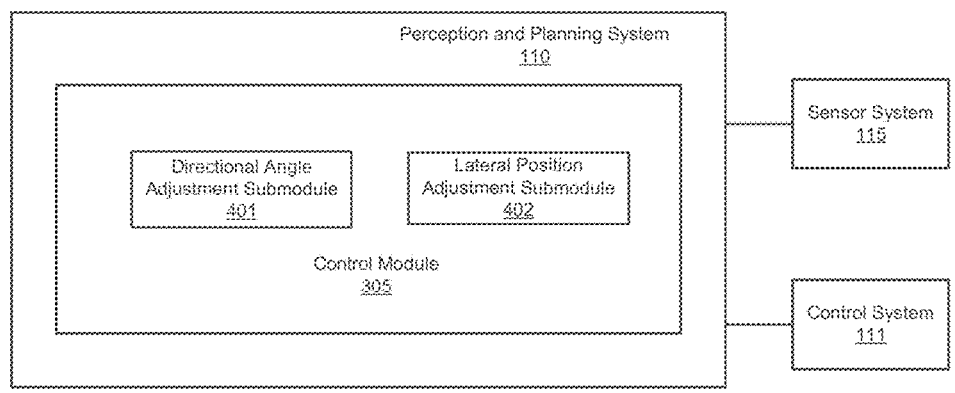
FIG. 4A is a block diagram illustrating an example of a control module of a perception and planning system according to one embodiment of the invention.

FIG. 4A illustrates a control module 305 according to one embodiment. The control module 305 includes a directional angle adjustment submodule 401 and a lateral position adjustment submodule 402. These submodules are responsible for mitigating deviations in a target and an actual directional (steering) angle and deviations in a target and an actual lateral position of the ADV, respectively. The directional angle adjustment submodule 401 mitigates a deviation in a target and an actual directional steering angle of an ADV.

Figure 4B:
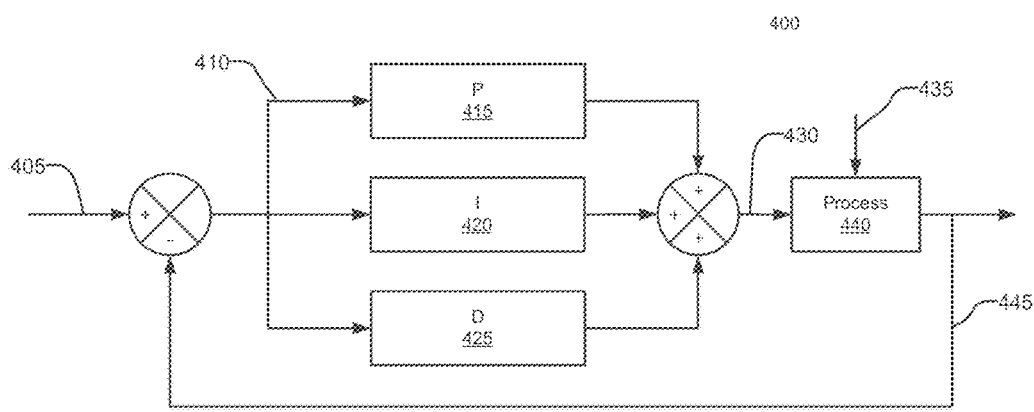
FIG. 4B is a block diagram illustrating an example of a proportional integral derivative (PID) controller according to one embodiment of the invention.

An example of a directional angle adjustment submodule 401 may include a first PID controller. FIG. 4B is a block diagram of a proportional integral derivative (PID) controller, according to one embodiment. A PID controller is a control loop feedback mechanism commonly used in industrial control systems. A PID controller continuously calculates an error value as the difference between a target value and an actual value of a process and applies a correction based on proportional, integral, and derivative terms, denoted as P, I, and D respectively. For example, a PID controller may be represented by an equation:

$$\text{PID\_output}(t) \propto P + I + D = K_p e(t) + K_i \int_0^\tau e(t)dt + K_d \frac{de(t)}{dt};$$

where e(t)=error (t)=t arg et_setpo int(t)−measured_output (t) is the error term to be reduced, $K_p$, $K_i$, and $K_d$ are the proportional, integral, and derivative coefficients of a PID controller, respectively. Referring to FIG. 4B, PID controller 400 may be an analog device. The PID controller 400 has an input target set-point 405 representative of a desired target value. Target set-point 405 is subtracted from process output 445 (representative of a measured output of the PID controller 400) to give an error 410. The error 410 is fed to a proportional (P) mode of control 415, an integral (I) mode of control 420, and a derivative (D) mode of control 425. The integral (I) mode of control 420, and a derivative (D) 425 mode of control may be implemented by an integrator (such as a low pass filter) circuit or equivalent thereof, and a differentiator (such as a high pass filter) circuit or equivalent thereof, respectively. The output from the P 415, I 420, and D 425 modes of control in sum is the PID output 430. The PID output 430 is connected to a process 440 (the system to be controlled) such that the process 440 includes an external disturbance 435. The process 440 produces a measured output 445, which is fed back to the input of the P 415, I 420, and D 425 modes of control to form the close-loop.

While in operation, if an external disturbance 435 is zero, or there is no disparity between a target set-point 405 and a process output 445, then error 410 equals to zero and PID output 430 equals to zero. Since a zero PID output 430 feeds into the process 440 will make no adjustment to the process output 445 provided that there is a zero external disturbance 435. Thereafter, the process output 445 remains the same and the PID controller 400 reaches equilibrium. However, if there is a non-zero external disturbance 435, or a disparity between a target set-point 405 and a process output 445 (e.g., process output 445 of a previous cycle), then error 410 will be nonzero and P 415, I 420, and D 425 modes of control will produce an intermediate output 430 based on $K_p$, $K_i$, and $K_d$ coefficients of the PID controller to correct (or reduce) the error 410. The PID controller 400 is not limited to an analog device and may be implemented as a digital device or a software program.

Referring to FIG. 4B, an exemplary digital implementation of a PID controller 400 may include a clock (not shown) with a clock cycle (or cycle) of 10 milliseconds. A digital PID controller 400 has an input target set-point 405 representative of a desired value of the current cycle. Target set-point 405 is subtracted from process output 445 (representative of a measured output of the PID controller 400 of a previous cycle) to give an error 410 for the current cycle. The error 410 of the current cycle is fed to a proportional (P) mode of control 415, an integral (I) mode of control 420, and a derivative (D) mode of control 425. The integral (I) mode of control 420, and a derivative (D) 425 mode of control may be implemented by an integrator circuit, and a differentiator circuit, respectively. The output from the P 415, I 420, and D 425 modes of control in sum is the PID output 430. The PID output 430 is connected to a process 440 such that the process 440 includes an external disturbance 435 and may include a process delay. The process 440 produces a measured output 445 of the current cycle, which is fed back to the input of the P 415, I 420, and D 425 modes of control to form the close-loop. In this exemplary implementation, input and intermediate signal wires may be eight-bits, add, subtract, and multiply operations may be implemented with operational amplifiers, adders, XOR, and and/or gates.

The PID controller 400 may also be implemented as a software program. For example, the PID controller 400 may be implemented in python, or any programming language, by a subroutine which is called every 10 milliseconds. The PID controller subroutine may have five inputs, such as: input for error 410 (i.e., target set-point 405 of current cycle minus measured output 445 of last cycle) of current cycle, input for error 410 of last cycle (i.e., target set-point 405 of last cycle minus measured output 445 of last two cycle), and three inputs for $K_p$, $K_i$, and $K_d$ coefficients of the PID controller, respectively. The output of the subroutine is the PID output 430.

The P mode of control 415 multiplies inputs $K_p$ coefficient and error 410 of the current cycle. The I mode of control 420 multiplies $K_i$ coefficient, the cycle period (10 milliseconds in this case), and error 410 of current cycle. The D mode of control 425 multiplies $K_d$ coefficient, error 410 of current cycle subtracts error 410 of last cycle, divided by the cycle period. The output from the P 415, I 420, and D 425 modes of control is summed up to produce a PID output 430 of current cycle, or the output of the subroutine. The PID output 430 or output of the subroutine is added to a process 440 such that the process 440 includes an external disturbance 435 and may include a process time delay. The process 440 produces a measured output 445 of the current cycle, which is used as an input to the PID controller subroutine for the next cycle. For example, the PID controller subroutine may be represented by the discretized equation:

$$\text{PID\_output}(n) \propto P + I + D = K_p \times e(n) + K_i \times e(n) \times \Delta t + K_d \frac{e(n) - e(n-1)}{\Delta t};$$

where e(n)=error (n)=t arg et_setpo int(n)−measured_output (n−1) is the error term of the nth cycle to be reduced, $K_p$, $K_i$, and $K_d$ are the proportional, integral, and derivative coefficients of a PID controller, respectively, and $\Delta t$ is the cycle period.

Figure 5:
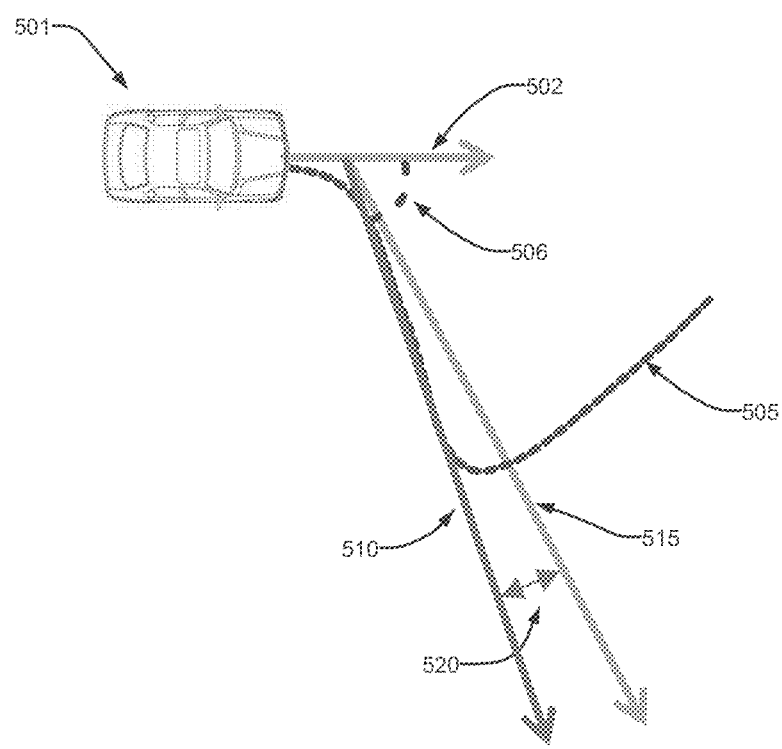
FIG. 5 is a diagram illustrating application of a steering angle adjustment according to one embodiment of the invention.

FIG. 5 is a diagram illustrating an ADV 501 in operation with a directional angle deviation or error 520, according to one embodiment. The ADV 501 heads in a direction 502 on a planned route 505. The ADV 501 makes a subsequent turn with turning angle 506 to stay on route with a subsequent target directional angle 510. In this example, turning angle 506 is the same as target directional angle 510. FIG. 5 illustrates that the ADV 501 has a subsequent actual directional angle 515, i.e., measured/sensed output angle of the ADV, in response to a steering command based on target directional angle 510, resulting in a directional angle deviation or error 520. The directional angle adjustment submodule 401 mitigates, or decreases, the directional angle deviation or error 520 taking into account a delay in commanding the steering control system and/or a delay in data acquisition of a current steering control directional angle of the ADV.

In one embodiment, the directional angle adjustment submodule 401 may be modeled by a first proportional-integral-derivative (PID) controller. For example, the PID models 312 may include the equation:

$$\text{angle}(t) \propto P + I + D = K_p e(t) + K_i \int_0^t e(t)dt + K_d \frac{de(t)}{dt};$$

where e(t)=direction$_{t\ arg\ et}$−direction$_{actual}$ is the error or deviation in directional angle to be reduced, $K_p$, $K_1$ and $K_d$ are the first set of proportional, integral, and derivative coefficients of the first PID controller, respectively, and angle(t) is the first steering angle. The first steering angle is converted into a steer control command based on a mathematical model of the steering wheel control to control a subsequent steering angle of the ADV.

At the outset, $K_p$, $K_i$ and $K_d$ coefficients has to be trained or tuned. In one embodiment, the first PID controller coefficients $K_p$, $K_i$ and $K_d$ may be tuned or trained offline by machine learning engine 122 based on a large set of driving statistics 123 at the data analytics system 103. In another embodiment, the first PID controller coefficients may be adjusted dynamically during operation of the ADV by a control module 305 of perception and planning system 110. In one embodiment, the first PID controller may be implemented by an analog or digital hardware device. In another embodiment, the first PID controller may be implemented by a software program.

With respect to the first PID controller, in one embodiment, the $K_p$ coefficient is adjusted dynamically based on the current speed of the ADV. In another embodiment, the $K_p$ coefficient is reduced in response to determining that the current speed is above a predetermined threshold. In one embodiment, the $K_d$ coefficient is adjusted dynamically based on the current speed of the ADV. In another embodiment, $K_p$ is adjusted dynamically based on a turning radius of the ADV. In another embodiment, $K_p$ is increased in response to determining that the turning radius is above a predetermined threshold (e.g., greater than 0.1).

Figure 6:
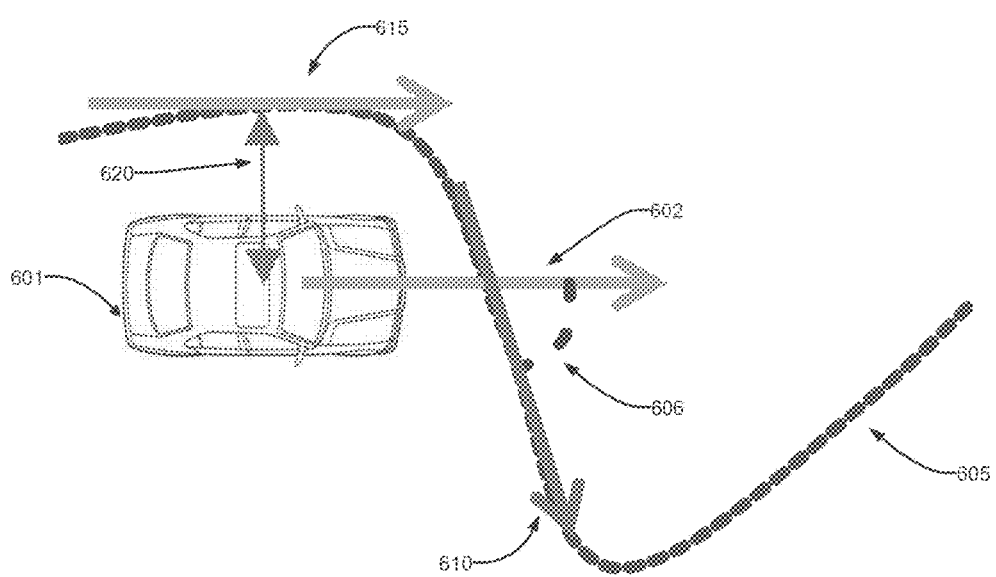
FIG. 6 is a diagram illustrating application of a lateral displacement steering compensation according to one embodiment of the invention.

The lateral position adjustment submodule 402 mitigates a deviation in a target lateral position and an actual lateral position of an ADV. FIG. 6 is a diagram illustrating an ADV 601 in operation with a lateral position deviation 620, according to one embodiment. The ADV 601 heads in a directional angle 602 on a planned route 605. The ADV 601 makes a subsequent steer with turn angle 606 to stay on course with a subsequent target lateral position 610. FIG. 6 illustrates that the ADV 601 has a lateral position displacement such that the difference between the current lateral position (center of the ADV 601) and the current target lateral position 615 differs by the lateral position deviation 620. The lateral position adjustment submodule 402 mitigates, or decreases, the lateral position deviation 620 taking into account a command delay in sending an instruction to the steering control and a delay in acquiring a current lateral position 602 of the ADV.

In one embodiment, the lateral position adjustment submodule 402 may be modeled by a second PID controller. For example, the PID models 312 may include the equation:

$$\text{lateral}(t) \propto P + I + D = L_p e(t) + L_i \int_0^t e(t)dt + L_d \frac{de(t)}{dt};$$

where $e(t) = \text{lateral}_{t\_arg\_et} - \text{lateral}_{actual}$ is the lateral position deviation of the ADV to be reduced, $L_p$, $L_i$ and $L_d$ are the second set of proportional, integral, and derivative coefficients of the second PID controller, and lateral(t) is the second steering angle. The second steering angle is converted into a steer control command based on a mathematical model of the steering wheel control to control a subsequent steering angle of the ADV.

At the outset, the $L_p$, $L_i$ and $L_d$ coefficients have to be trained or tuned. In one embodiment, the second PID controller coefficients $L_p$, $L_i$ and $L_d$ may be trained or tuned offline by machine learning engine 122 based on a large set of driving statistics 123 at the data analytics system 103. In another embodiment, these coefficients may be adjusted dynamically during operation of the ADV by a control module 305 of perception and planning system 110. In one embodiment, the second PID controller may be implemented by an analog or digital hardware device. In another embodiment, the second PID controller may be implemented by a software program.

With respect to the second PID controller, in one embodiment, the $L_p$, $L_i$, and $L_d$ coefficients are adjusted dynamically based on at least one of a current speed of the ADV, a current turning radius of the ADV, and a last command of the ADV. In another embodiment, a target steering angle is determined based on a summation of the first and the second steering angle to control a subsequent steering angle of the ADV. Note that although there is a first PID controller for directional cycle adjustment and a second PID controller for lateral position adjustment, these two PID controllers can be integrated into a single PID controller.

Figure 7:
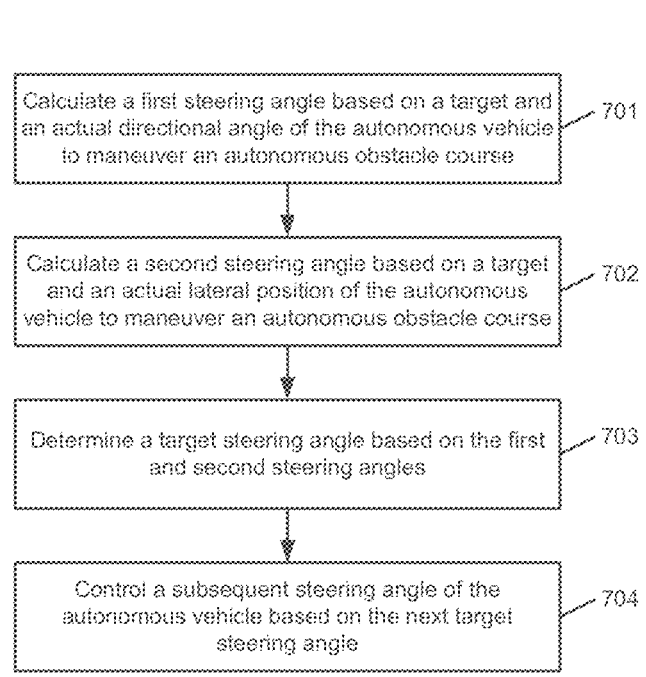
FIG. 7 is a flow diagram illustrating a process to calculate a subsequent steering angle of an ADV according to one embodiment.

FIG. 7 is a flow diagram illustrating a process to calculate a subsequent steering angle of an ADV according to one embodiment. Process 700 may be performed by processing logic which may include software, hardware, or a combination thereof. For example, process 700 may be performed by a control module of an autonomous vehicle, such as control module 305 of perception and planning system 110. Referring to FIG. 7, at block 701, processing logic calculates a first steering angle based on a target and an actual directional angle of an ADV to autonomously maneuver a planned route or obstacle course. At block 702, processing logic calculates a second steering angle based on a target and an actual lateral position of the ADV to autonomously maneuver a planned route or obstacle course. At block 703, processing logic determines a target steering angle based on the first and second steering angle. At block 704, control module 305 of the perception and planning system 110 controls a subsequent steer of the ADV based on the target steering angle.

Figure 8:
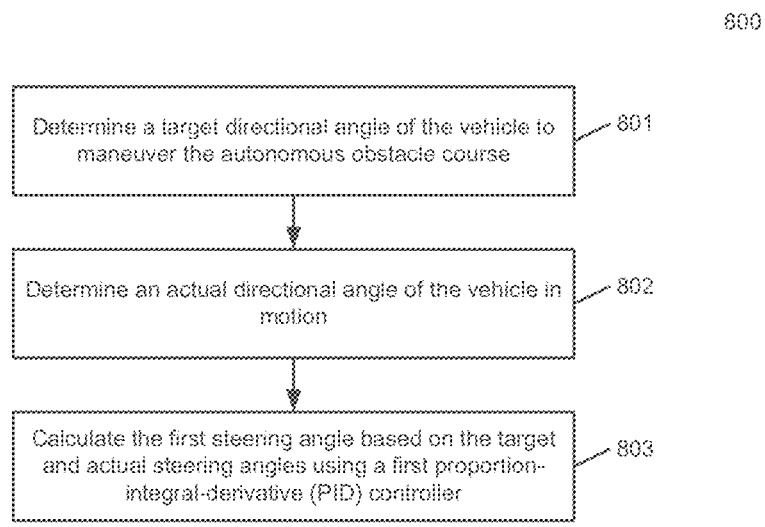
FIG. 8 is a flow diagram illustrating a process to calculate the first steering angle according to one embodiment.

FIG. 8 is a flow diagram illustrating a process to calculate the first steering angle according to one embodiment. Process 800 may be performed by processing logic which may include software, hardware, or a combination thereof. For example, process 800 may be performed by a control module of an autonomous vehicle, such as control module 305 of perception and planning system 110. Process 800 may be performed as a part of operations at block 701. Referring to FIG. 8, at block 801, processing logic determines a target directional angle of the autonomous vehicle to maneuver a planned route or an object or obstacle course. At block 802, processing logic determines an actual directional angle of the ADV in motion. At block 803, processing logic calculates the first steering angle based on the target and the actual steering angles using a first PID controller in view of a command delay and a delay in acquiring the actual directional angle of the ADV.

Figure 9:
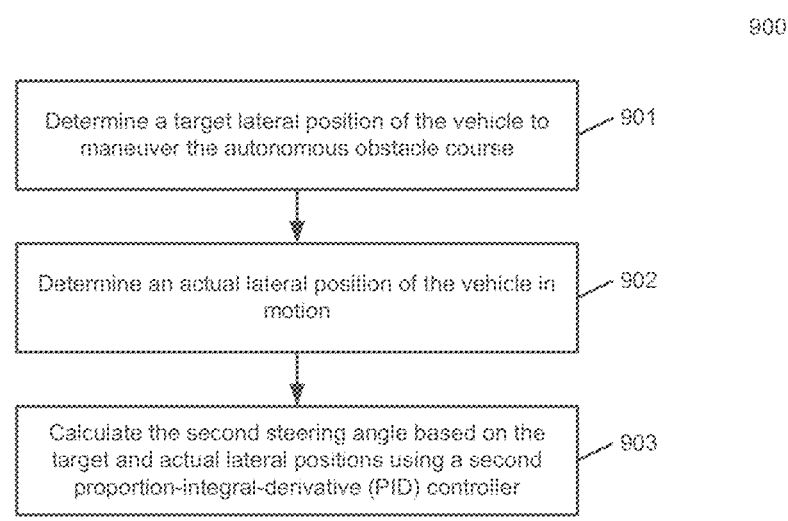
FIG. 9 is a flow diagram illustrating a process to calculate the second steering angle according to one embodiment.

FIG. 9 is a flow diagram illustrating a process to calculate the second steering angle according to one embodiment. Process 900 may be performed by processing logic which may include software, hardware, or a combination thereof. For example, process 900 may be performed by a control module of an autonomous vehicle, such as control module 305 of perception and planning system 110. Process 900 may be performed as a part of operations at block 702. Referring to FIG. 9, at block 901, processing logic determines a target lateral position of the autonomous vehicle to maneuver a planned route or an object or obstacle course. At block 902, processing logic determines an actual lateral position of the ADV in motion. At block 903, processing logic calculates the second steering angle based on the target and the actual lateral positions using a second PID controller in view of a command delay and a delay in acquiring the actual lateral position of the ADV.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 10:
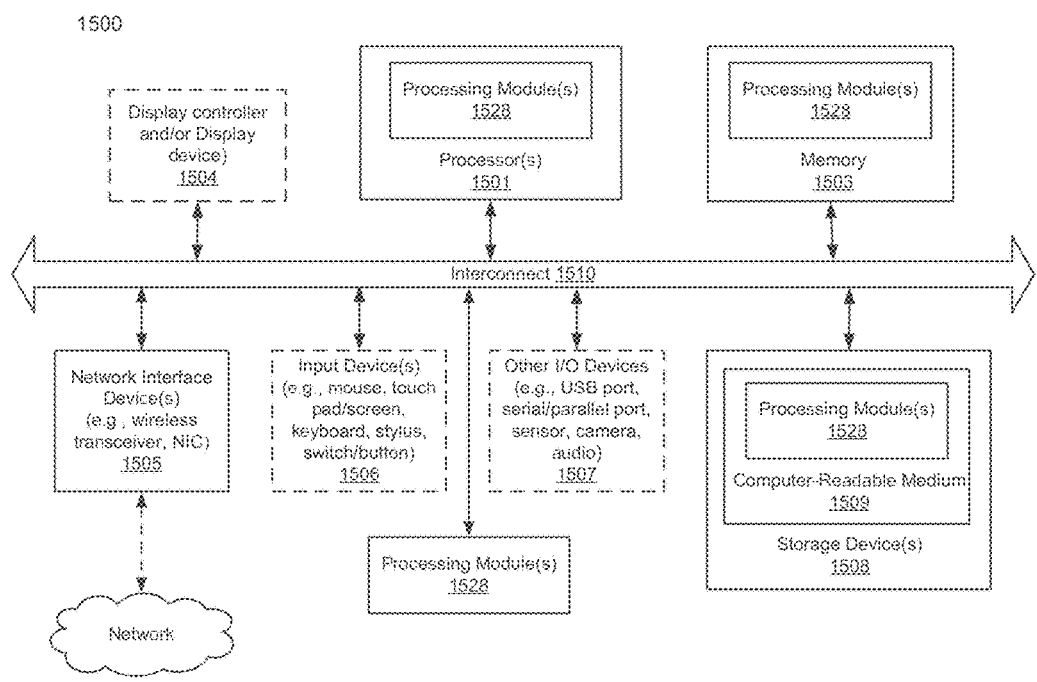
FIG. 10 is a block diagram illustrating a data processing system according to one embodiment.

FIG. 10 is a block diagram illustrating an example of a data processing system which may be used with one embodiment of the invention. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, control module 305 or machine learning engine 122. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for steering controlling of an autonomous vehicle, the method comprising:
calculating a first steering angle based on a target directional angle and an actual directional angle of the autonomous vehicle to maneuver an obstacle course;
calculating a second steering angle based on a target lateral position and an actual lateral position of the autonomous vehicle to maneuver the obstacle course;
determining a next target steering angle based on the first and second steering angles; and
controlling a subsequent steering angle of the autonomous vehicle based on the next target steering angle.

2. The method of claim 1, wherein calculating a first steering angle comprises:
determining the target directional angle of the autonomous vehicle to maneuver the obstacle course;
determining the actual directional angle of the autonomous vehicle in motion; and
calculating the first steering angle based on the target and actual steering angles using a first proportion-integral-derivative (PID) controller.

3. The method of claim 2, further comprising:
determining a current speed of the autonomous vehicle; and
adjusting a proportional coefficient of the first PID controller based on the current speed of the autonomous vehicle.

4. The method of claim 3, further comprising reducing the proportional coefficient of the first PID controller in response to determining that the current speed is above a predetermined threshold.

5. The method of claim 3, further comprising adjusting a derivative coefficient of the first PID controller based on the current speed of the autonomous vehicle.

6. The method of claim 2, further comprising:
determining a turning radius of the autonomous vehicle; and
adjusting a proportional coefficient of the first PID controller based on the turning radius of the autonomous vehicle.

7. The method of claim 6, further comprising increasing the proportional coefficient of the first PID controller in response to determining that the turning radius is above a predetermined threshold.

8. The method of claim 1, wherein calculating a second steering angle comprises:
determining the target lateral position of the autonomous vehicle to maneuver the obstacle course;
determining the actual lateral position of the autonomous vehicle in motion; and
calculating the second steering angle based on the target and actual lateral positions using a second proportion-integral-derivative (PID) controller.

9. The method of claim 8, further comprising adjusting the proportional, integral and derivative coefficients of the second PID controller based on at least one of a current speed of the autonomous vehicle, a current turning radius of the autonomous vehicle for a vehicular path, and a last command of the autonomous vehicle.

10. A non-transitory machine-readable medium having instructions stored therein, which when executed by a processor, cause the processor to perform operations of steering control of an autonomous vehicle, the operations comprising:
calculating a first steering angle based on a target directional angle and an actual directional angle of the autonomous vehicle to maneuver an obstacle course;
calculating a second steering angle based on a target lateral position and an actual lateral position of the autonomous vehicle to maneuver the obstacle course;
determining a next target steering angle based on the first and second steering angles; and
controlling a subsequent steering angle of the autonomous vehicle based on the next target steering angle.

11. The machine-readable medium of claim 10, wherein calculating a first steering angle comprises:
determining the target directional angle of the autonomous vehicle to maneuver the obstacle course;
determining the actual directional angle of the autonomous vehicle in motion; and
calculating the first steering angle based on the target and actual steering angles using a first proportion-integral-derivative (PID) controller.

12. The machine-readable medium of claim 11, wherein the operations further comprise:
determining a current speed of the autonomous vehicle; and
adjusting a proportional coefficient of the first PID controller based on the current speed of the autonomous vehicle.

13. The machine-readable medium of claim 12, wherein the operations further comprise reducing the proportional coefficient of the first PID controller in response to determining that the current speed is above a predetermined threshold.

14. The machine-readable medium of claim 12, wherein the operations further comprise adjusting a derivative coefficient of the first PID controller based on the current speed of the autonomous vehicle.

15. The machine-readable medium of claim 11, wherein the operations further comprise:
determining a turning radius of the autonomous vehicle; and
adjusting a proportional coefficient of the first PID controller based on the turning radius of the autonomous vehicle.

16. The machine-readable medium of claim 15, wherein the operations further comprise increasing the proportional coefficient of the first PID controller in response to determining that the turning radius is above a predetermined threshold.

17. The machine-readable medium of claim 10, wherein calculating a second steering angle comprises:
determining the target lateral position of the autonomous vehicle to maneuver the obstacle course;
determining the actual lateral position of the autonomous vehicle in motion; and
calculating the second steering angle based on the target and actual lateral positions using a second proportion-integral-derivative (PID) controller.

18. The machine-readable medium of claim 17, wherein the operations further comprise adjusting the proportional, integral and derivative coefficients of the second PID controller based on at least one of a current speed of the autonomous vehicle, a current turning radius of the autonomous vehicle for a vehicular path, and a last command of the autonomous vehicle.

19. A data processing system, comprising:
a processor; and
a memory coupled to the processor to store instructions, which when executed by the processor, cause the processor to perform operations of steering control of an autonomous vehicle, the operations including
calculating a first steering angle based on a target directional angle and an actual directional angle of the autonomous vehicle to maneuver an obstacle course;
calculating a second steering angle based on a target lateral position and an actual lateral position of the autonomous vehicle to maneuver the obstacle course;
determining a next target steering angle based on the first and second steering angles; and
controlling a subsequent steering angle of the autonomous vehicle based on the next target steering angle.

20. The data processing system of claim 19, wherein calculating a first steering angle comprises:
determining the target directional angle of the autonomous vehicle to maneuver the obstacle course;
determining the actual directional angle of the autonomous vehicle in motion; and
calculating the first steering angle based on the target and actual steering angles using a first proportion-integral-derivative (PID) controller.

21. The data processing system of claim 20, wherein the operations further comprise:
determining a current speed of the autonomous vehicle; and
adjusting a proportional coefficient of the first PID controller based on the current speed of the autonomous vehicle.

22. The data processing system of claim 21, wherein the operations further comprise reducing the proportional coefficient of the first PID controller in response to determining that the current speed is above a predetermined threshold.

23. The data processing system of claim 21, wherein the operations further comprise adjusting a derivative coefficient of the first PID controller based on the current speed of the autonomous vehicle.

24. The data processing system of claim 20, wherein the operations further comprise:
determining a turning radius of the autonomous vehicle; and
adjusting a proportional coefficient of the first PID controller based on the turning radius of the autonomous vehicle.

25. The data processing system of claim 24, wherein the operations further comprise increasing the proportional coefficient of the first PID controller in response to determining that the turning radius is above a predetermined threshold.

26. The data processing system of claim 19, wherein calculating a second steering angle comprises:
determining the target lateral position of the autonomous vehicle to maneuver the obstacle course;
determining the actual lateral position of the autonomous vehicle in motion; and
calculating the second steering angle based on the target and actual lateral positions using a second proportion-integral-derivative (PID) controller.

27. The data processing system of claim 26, wherein the operations further comprise adjusting the proportional, integral and derivative coefficients of the second PID controller based on at least one of a current speed of the autonomous vehicle, a current turning radius of the autonomous vehicle for a vehicular path, and a last command of the autonomous vehicle.

* * * * *